US006558457B1

United States Patent
Kolczyk

(10) Patent No.: US 6,558,457 B1
(45) Date of Patent: May 6, 2003

(54) DRYING AGENT BOX

(75) Inventor: Markus Kolczyk, Besigheim (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/715,042

(22) Filed: Nov. 20, 2000

(30) Foreign Application Priority Data

Nov. 20, 1999 (DE) .......................................... 199 55 898

(51) Int. Cl.[7] .............................................. B01D 53/00
(52) U.S. Cl. ........................... 96/134; 96/131; 55/318; 55/495; 55/DIG. 17
(58) Field of Search ................... 55/315, 318, DIG. 17, 55/495; 96/131, 133, 134, 135, 137, 149, 108

(56) References Cited

U.S. PATENT DOCUMENTS

| 2,930,445 | A | * | 3/1960 | Glass et al. | |
| 3,464,186 | A | * | 9/1969 | Hankinson et al. | 96/115 |
| 3,472,000 | A | | 10/1969 | Glass et al. | |
| 4,013,566 | A | * | 3/1977 | Taylor | 210/497.01 |
| 4,015,959 | A | * | 4/1977 | Grote | 55/DIG. 17 |
| 4,029,486 | A | * | 6/1977 | Frantz | 55/DIG. 17 |
| 4,081,397 | A | * | 3/1978 | Booe | 252/194 |
| 4,220,553 | A | * | 9/1980 | Krause | 264/109 |
| 4,320,000 | A | * | 3/1982 | Lange et al. | 210/117 |
| 4,474,661 | A | * | 10/1984 | Nearpass et al. | 210/437 |
| 4,581,047 | A | * | 4/1986 | Larsson | |
| 4,673,420 | A | * | 6/1987 | Haker et al. | |
| 4,816,047 | A | * | 3/1989 | Neal | 96/137 |
| 4,954,252 | A | * | 9/1990 | Griffin et al. | 137/512.4 |
| 5,002,593 | A | * | 3/1991 | Ichishita et al. | 96/137 |
| 5,158,077 | A | * | 10/1992 | Sundstrom | |
| 5,427,609 | A | * | 6/1995 | Zoglman et al. | 96/135 |
| 5,622,544 | A | * | 4/1997 | Shamine et al. | 96/134 |
| 5,702,508 | A | * | 12/1997 | Moratalla | 55/523 |
| 5,779,772 | A | * | 7/1998 | Unger et al. | 96/137 |
| 5,792,245 | A | * | 8/1998 | Unger et al. | 96/137 |

FOREIGN PATENT DOCUMENTS

| DE | 23 11 813 | 9/1973 |
| DE | 196 27 889 | 1/1998 |
| DE | 197 04 178 | 8/1998 |
| DE | 198 15 564 | 10/1999 |

* cited by examiner

Primary Examiner—David A. Simmons
Assistant Examiner—Frank M. Lawrence
(74) Attorney, Agent, or Firm—Crowell & Moring LLP

(57) ABSTRACT

A drying agent box 10 which serves to remove moisture from air, especially for a compressed-air brake apparatus, and which comprises a housing 11 with at least one inlet 14 and at least one outlet 15, the housing 11 being formed by a container 12 and a flange 13. A drying agent body 18, which has a stable shape, is contained in the housing 11. Channels 22 may optionally be provided in the drying agent body for guiding the flow of air through the body. Different ways of installing the drying agent body 18 in the housing 11 also are described. Due to the stable shape of the drying agent body 18, the structure of the drying agent box is simplified because there is no need for components to hold a granular drying agent in place.

22 Claims, 4 Drawing Sheets

DRYING AGENT BOX

BACKGROUND OF THE INVENTION

The invention relates to a drying agent box for drying compressed air, comprising a housing having at least one inlet and at least one outlet, and a body of drying agent contained in said housing interposed in a flow path between the inlet and the outlet.

Published German Patent Application No. DE 197 04 178 discloses a drying agent box for an air dryer, which has an inlet and an outlet. The inlet is releasably joined to a passage in the interior of the housing. The passage adjoins a perforated plate which has inlet and outlet openings. On this perforated plate a pipe section opposite the passage is formed which affects the direction of flow of the air. A container filled with granular drying agent is applied to the perforated plate, and a foam material layer extends over the drying agent. A cover, which is screwed into the housing, serves to affix the container full of drying agent to the perforated plate. The drying agent can be replaced by removing the container from the air dryer.

In view of the loose filling of drying agent, however, no precise filling of the container is possible, so that there is a danger that voids may form between the granular drying agent, which shrink in size when in operation, and thus no more compression prevails in the drying agent. Another disadvantage of this embodiment is the mounting of the container filled with drying agent onto the perforated plate. In this case the pipe section must extend into the drying agent, which presents problems in an optimally filled container. Furthermore, in this embodiment of an air dryer components are necessary for holding and compressing the drying agent, and this involves an expenditure of money and material, and also the weight of the parts is increased.

SUMMARY OF THE INVENTION

It is therefore the object of the invention to provide a drying agent box which has a simple structure.

It is also an object of the invention to provide a drying agent box which is easy to install and to maintain.

Another object of the invention is to provide a drying agent box which is light weight and can be manufactured at reasonable cost.

These and other objects are achieved in accordance with the invention by providing a drying agent box for drying compressed air, comprising a housing having at least one inlet and at least one outlet, and a body of drying agent contained in said housing interposed in a flow path between the inlet and the outlet, wherein the drying agent body has a stable shape.

The drying agent box of the invention is advantageously suited to remove moisture from air, at the same time assuring ease of installation and maintenance.

The drying agent box comprises a housing with a container and a flange. The container is sealingly joined to the flange. This can be accomplished by screwing or snapping the parts together. If desired, a gasket may be inserted between the housing and flange to seal them to each other. The housing has an inlet and an outlet. The inlet is sealingly joined to a one-piece drying agent body which is made, for example, by sintering with pores, or by casting with built-in channels so that no leakage occurs between inlet and outlet. The drying agent body has a stable shape and can be used as an independent unit in the container. Thus granule containers and their fastening means can be dispensed with.

It is advantageous to insert an oil separator between the inlet and the drying agent body. In such a case, variations are possible in the manner of installation or assembly between the flange and the funnel, which define a path of flow for the air, or variants of installation in the gap between the container and the drying agent body. In this way oil can be removed from oily air before it comes in contact with the drying agent body. This lengthens the useful life of the drying agent body, since oil no longer clogs the pores which absorb the moisture.

In accordance with another embodiment of the invention the drying agent body is divided into segments which contain channels for carrying the flow. These channels carry the air from the inlet through the drying agent body. After passing once through the drying agent body the air can reach the outlet.

In other variants, after the air has left the drying agent body it is turned around in the container and flows again in the opposite direction through the drying agent body toward the outlet. The repeated passage of the air through the drying agent body achieves a greater degree of dryness.

One specific embodiment of the invention has a gap between the drying agent body and the housing. If the air to be dried is fed through the gap, the air can be pre-dried at the circumferential surface of the drying agent body before it enters the drying agent body and flows toward the outlet.

Another embodiment of the invention provides for sealing the drying agent body to the housing. Thus any cross flow carrying insufficiently dried air to the outlet is prevented. In this case the sealing can be accomplished by means of a jacket. This jacket can also have a vibration damping action, so that the drying agent is not exposed to any direct vibration. The jacket can have different configurations. In one variant, a jacket of an elastomer is applied around the drying agent body, clinging to it tightly, and absorbs slight, weak or strong shocks depending on the jacket's thickness. Embodiments with textured jackets are conceivable, which can have textures on the inside or outside. For better utilization of space, in this variant a gap between the drying agent body and the housing can be omitted, so that a better support of the drying agent body is additionally achieved.

An advantageous embodiment of the inventive concept is a modular form of the drying agent body. In this case, the drying agent body is composed of at least two drying agent modules, which can have air ducts in them, though this is not absolutely necessary. A combination of directional-flow drying agent modules with nondirectional-flow drying agent modules is another possible variant. With a modular construction, the drying of the air may be improved, since when it enters a directional-flow drying agent module it still has a turbulent flow which nevertheless changes after a certain distance to a linear flow. In the case of linear air flow only the marginal areas are thoroughly dried by contact with the dir duct, and in the center of the air flow an isolated, poorly dried area forms. If a plurality of drying agent modules are arranged in succession, the linearized air exits from one air duct and must enter another air duct, while the well-dried air mixes with the poorly dried air and a turbulent flow of air is again achieved.

The drying agent modules can be sealingly fastened, for example, to ribs or other projections on the housing.

In accordance with another embodiment of the invention, connecting elements are provided, which join the individual drying agent modules sealingly together. These connecting elements can be of annular shape and extend around the circumference of the drying agent modules. The connecting pieces space the drying agent modules sufficiently apart to achieve the desired turbulence. In other embodiments the connecting pieces have a separating partition which is air-permeable. The permeability of the partition can be created by providing it with slits, holes or other openings. Another embodiment of the invention involves the use of one connecting element in which all of the drying agent modules are integrated. The connecting elements can be made of metal and adhesively bonded or cemented sealingly to the drying agent modules, or they can be fastened mechanically to the drying agent bodies with the use of a gasket. Furthermore, it is possible to make the connecting elements of synthetic resin materials, especially elastomers. In selecting the material for the individual connecting pieces, combinations of metal and synthetic resin may also be chosen.

It is advantageous to bias the drying agent bodies within the housing with a resilient element, such as a spring, which urges the drying agent body against the housing. This will prevent the drying agent body from vibrating in the housing and thereby destroying itself. The spring can be in the form of a spiral or leaf spring. Other types of resilient element are also possible, provided they can serve the purpose of resiliently urging the drying agent body against the housing due to their material properties, such as compressibility in the case of foams, for example, their geometry, especially a wavy shape, or mechanical operation.

Furthermore, the drying agent body can be adhesively bonded or cemented into the housing. This prevents movements of the drying agent body relative to the housing.

Another possible way of fastening the drying agent body in the housing is to provide the drying agent body and/or the housing with fastening points. In a first embodiment, only the drying agent body has fastening points which rest against the housing but the housing has no fastening points formed on it. A second variant provides fastening points formed only on the housing, and the drying agent body is supported thereon. And a third variant has fastening points both on the drying agent body and on the housing, which together provide for the fastening of the drying agent body in the housing. The fastening of the drying agent body to the housing can be achieved, e.g., by clips, screws or a bayonet connector. Furthermore, the drying agent body can be clamped within the housing without any special holding means.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
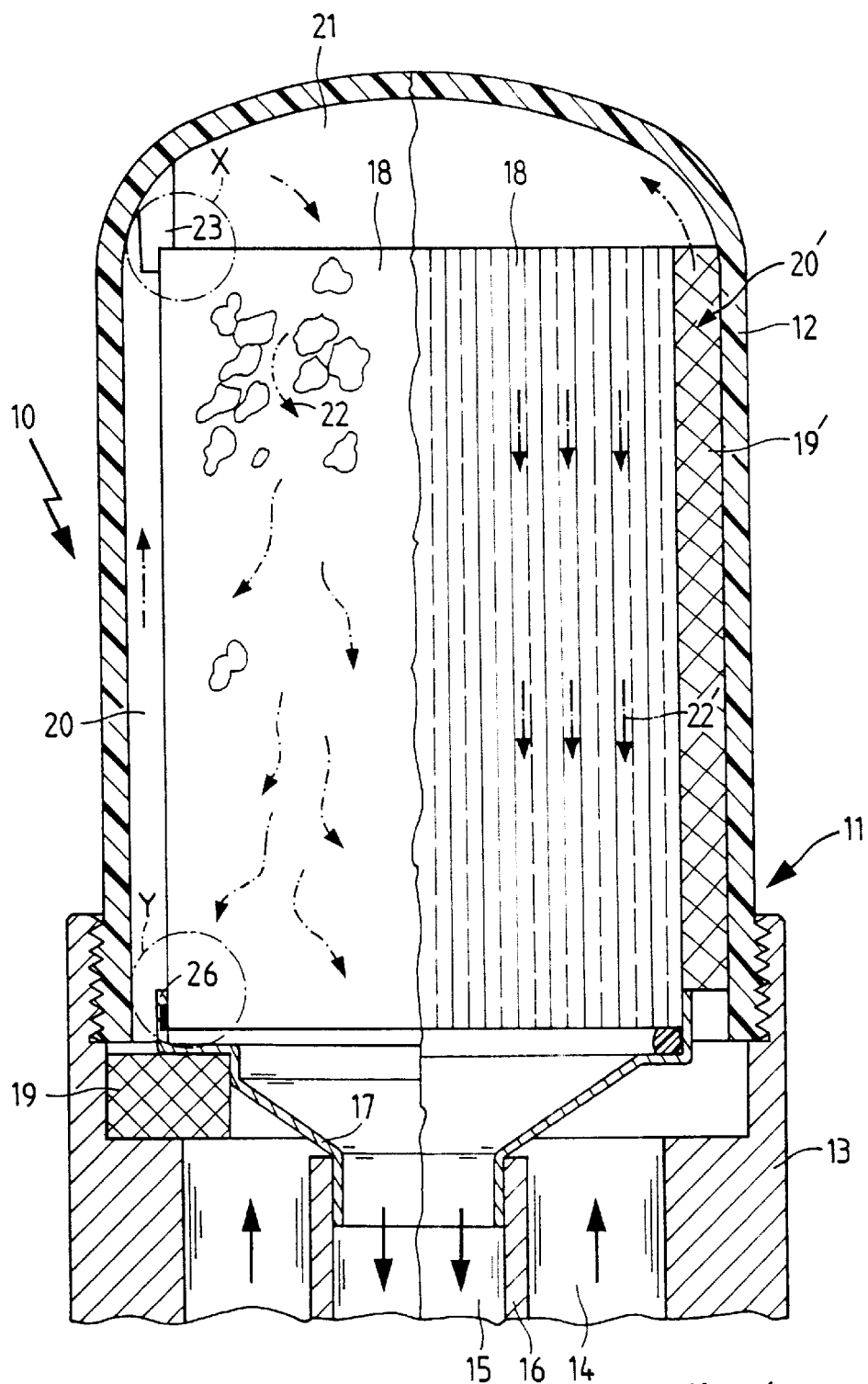
FIG. 1 is a sectional view of a drying agent box according to the invention.

FIG. 1 shows a sectional view of a drying agent box 10 in two variants. The drying agent box 10 is formed substantially by a housing 11 which comprises a container 12 of plastic and a flange 13 of metal. In this embodiment the housing parts 12 and 13 are screwed sealingly together. The flange 13 surrounds an inlet 14 and an outlet 15, the outlet 15 being separated from inlet 14 by a connector 16. A metal funnel 17 reaches into the connector 16, also of metal, the two components being joined sealingly together. A drying agent body 18 is supported in the funnel 17. The choice of material for the individual components can be as desired. The components can be made either of plastic or of metal, and combinations of plastic and metal are conceivable.

The left half of FIG. 1 shows the arrangement of an oil separator 19 which is supported on the flange 13 and the funnel 17. The raw air is first passed through the oil separator 19 before it encounters the drying agent body 18. Due to the use of an oil separator 19, the drying agent body 18 is not clogged by oil drops, and this substantially lengthens the useful life of the drying agent body 18. The drying agent box 10 has a gap 20 between the container 12 and the drying agent body 18. In this gap 20 the de-oiled air passes along the drying agent body 18 thereby undergoing a preliminary drying. After the air has entered a plenum chamber 21 formed by the container 12 and the drying agent body, it is turned and passes into the drying agent body 18, which is a sintered material which has drying properties and contains air-permeable pores. In the drying agent body 18 the air flows toward outlet 15, not holding to any defined flow path 22.

On the right half of FIG. 1 the oil separator 19' is situated in the gap 20' between container 12 and the drying agent body 18. In this embodiment the air is de-oiled through the entire length of gap 20, so that a better de-oiling of the air is achieved than in the embodiment on the left half of the figure. After the air has reached the plenum chamber 21 it passes through the drying agent body 18. In this embodiment the drying agent body 18 is made by a casting method in which flow paths 22' are formed when the drying agent body is made. The air must follow these paths 22' as it flows.

In both embodiments the de-oiled and dried air flows into the funnel 17 and is guided by the funnel to the outlet 15, from which the air is fed back to the system.

Figure 2:
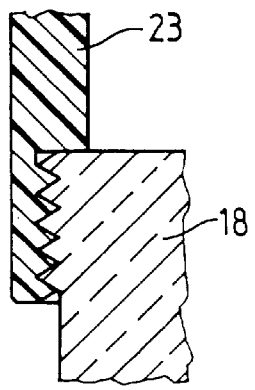
FIG. 2 is an enlarged sectional view of detail X of FIG. 1.

FIG. 2 is an enlarged sectional view of a detail X from the left half of FIG. 1. In this embodiment the drying agent body 18 is screwed into a holder or receptacle 23. The holder 23 can be formed directly on the container 12 or it can be a separate component fastened in the container 12 by screw threads, welding or adhesive bonding. In any event sufficient space should be provided between the holder 23 and the housing to permit the air to flow without appreciable resistance. The spaces must not be made too large, however, so that the drying agent body can be sufficiently supported.

Figure 3:
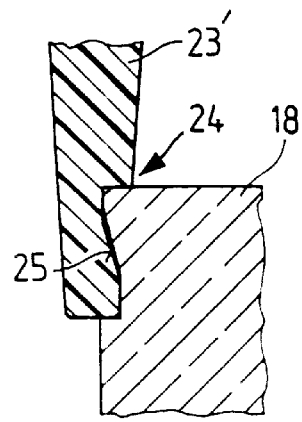
FIG. 3 is an enlarged sectional view of an alternate detail X of FIG. 1.

FIG. 3 shows an enlarged sectional view of a detail X from the left half of FIG. 1, which shows another variant of the support for the drying agent body 18 in the container 12. In this embodiment the drying agent body 18 is attached by a snap connector 24 to the holder 23'. This embodiment also needs a plurality of holders 23' to provide sufficient support for the drying agent body 18. The drying agent body 18 has a circumferential groove 25 which is engaged by the holder 23. Any rotation occurring during installation will have no adverse effect due to the circumferential groove 25 in the drying agent body 18.

Figure 4:
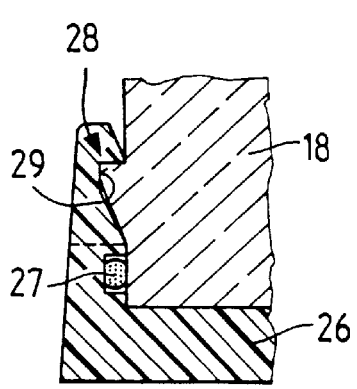
FIG. 4 is an enlarged sectional view of detail Y of FIG. 1.

FIG. 4 shows an enlarged section of a detail Y from FIG. 1. The drying agent body 18 is held in a socket 26. This socket 26 can be formed on the funnel 17 according to FIG. 1, or it can be integrated as an independent component into the drying agent box according to FIG. 1. Care must be taken that the socket 26 is sealingly joined to the funnel 17. On the circumference of the drying agent body 18 there is a molded area 28 which is snapped into a corresponding groove 29. To join the two components together, the socket 26 must be slotted or interrupted so as to be able to flex outwardly and receive the drying agent body 18. A gasket 27 is placed between the drying agent body 18 and the socket 26 to prevent air leakage between the incoming air and the discharge air, the gasket 27 being arranged underneath this connection. The socket 26 may be made, for example, of synthetic resin or metal.

Figure 5:
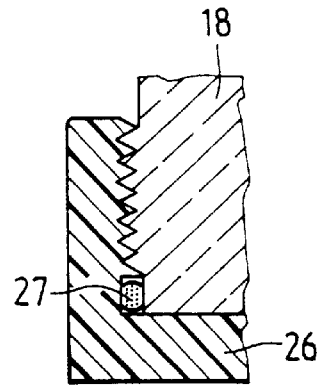
FIG. 5 is an enlarged sectional view of detail Y of FIG. 1.

FIG. 5 shows an enlarged sectional view of a detail Y from FIG. 1, which is an alternate embodiment of fastening the drying agent body 18 in the socket 26. In this embodiment the drying agent body 18 is screwed into the socket 26. As described with reference to the embodiment of FIG. 4, a gasket 27 also is provided in this embodiment to seal the incoming air flow from the discharge air.

Figure 6:
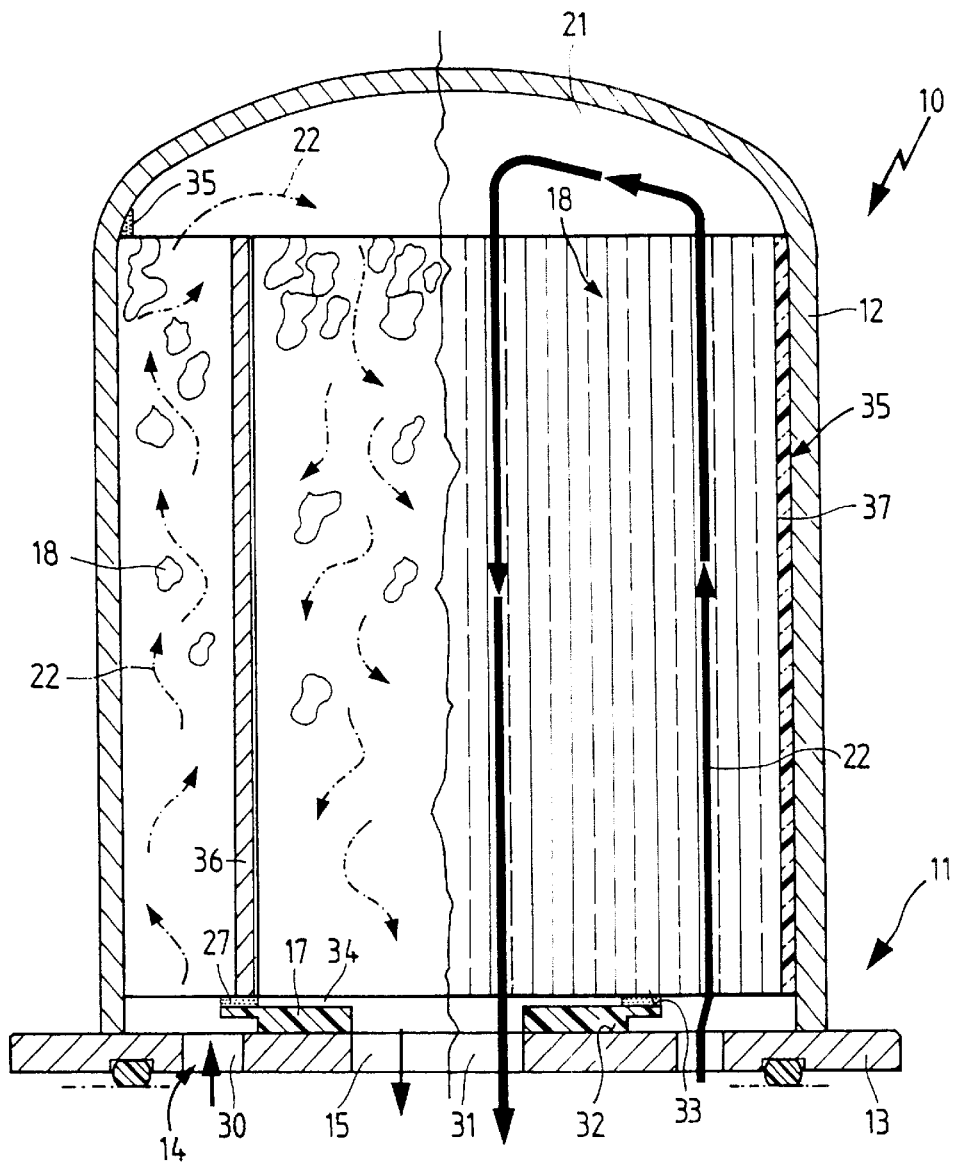
FIG. 6 is a sectional view of another embodiment of a drying agent box according to the invention.

FIG. 6 shows a sectional view of a drying agent box 10 in which the left and right halves of the drawing depict different embodiments. The housing 11 is formed by the container 12 and the flange 13 which are joined sealingly together in any desired manner, both of which are made of metal. In this embodiment the flange 13 is disk-shaped and can be screwed onto coupling components. The inlet 14 is formed by bores 30 in the flange 13, which are arranged such that air flows only into the outer area of the drying agent body 18. The outlet 15 is formed by a large, centrally disposed opening 31. The funnel 17 in this embodiment is likewise disk-shaped, but is made of synthetic resin material. It has a surface 32 in contact with flange 13 and a sealing surface 33 for the gasket 27. The gasket 27 forms an inner chamber 34 from which air is permitted to flow into the outlet 15. The drying agent body 18 is provided with a seal 35 relative to the container 12.

On the left half of FIG. 6 the sintered drying agent body 18 is inserted directly into the container 12 and provided with a gasket 35 at the upper end of the drying agent body 18. In this embodiment the drying agent body 18 has no geometrically formed fastening points. The drying agent body 18 is installed by inserting it into the container 12 and then held tightly in place by the flange 13 via the funnel 17 and the gasket 27. The drying agent body 18 has no flow guides and therefore is provided with an integral partition 36 to prevent cross flows and consequent insufficient drying of the air.

On the right half of FIG. 6 the drying agent body 18 is surrounded by a jacket 37 of, for example, an elastomer. This jacket produces on the one hand a seal between the container 12 and the drying agent body 18, and on the other hand suppresses vibrations to protect the drying agent body 18 against vibrations which could destroy it. In this embodiment the drying agent body 18 is configured such that the air is guided in channels 22. Therefore, it is unnecessary to include a partition, as shown on the left half of the figure.

Figure 7:
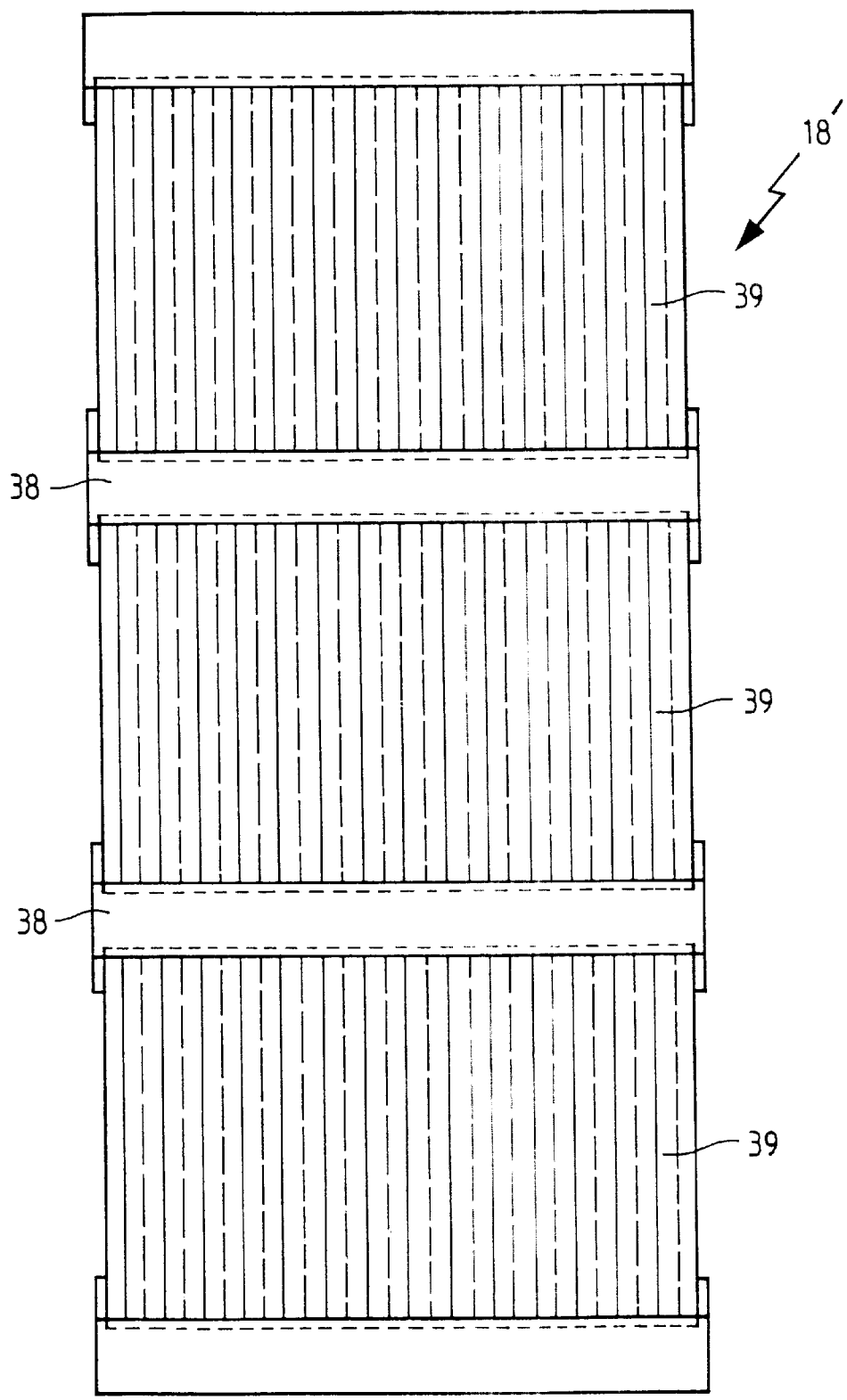
FIG. 7 is a schematic view of a drying agent body having a modular construction.

FIG. 7 shows a modular drying agent body 18', which is formed of three drying agent modules 39 joined by connecting elements 38. The connecting elements 38 are sealingly joined to the drying agent modules 39 so that no intermixing of raw and clean air takes place. For this purpose the connecting elements 38 are made of metal and are sealingly cemented to the drying agent modules 39. An additional purpose of the connecting elements 38 is to space the drying agent modules 39 apart and thus create new entryways in cast drying agent modules 39. Furthermore, the connecting elements 38 can divide the drying agent modules 39 into annular segments which can be sealingly separated from one another.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A drying agent box for drying compressed air, comprising a housing having at least one inlet and at least one outlet, a sintered or cast drying agent body contained in said housing interposed in a flow path between said inlet and said outlet, and a holder connected to an interior surface of the housing, wherein the drying agent body is screwed into the holder, and wherein the sintered or cast drying agent body has a stable shape.

2. A drying agent box according to claim 1, further comprising an oil separator interposed in the flow path between said inlet and said drying agent body.

3. A drying agent box according to claim 1, wherein the drying agent body has channels for guiding the flow.

4. A drying agent box according to claim 1, wherein there is a gap between the drying agent body and the housing.

5. A drying agent box according to claim 1, further comprising a seal between the drying agent body and the housing.

6. A drying agent box according to claim 1, wherein the drying agent body is surrounded by a jacket.

7. A drying agent box according to claim 1, wherein the drying agent body comprises a plurality of modular subunits joined in fixed relation to each other to form said stable shape.

8. A drying agent box according to claim 7, further comprising connecting elements which sealingly joining adjacent modular subunits of the drying agent body to each other.

9. A drying agent box according to claim 1, further comprising a resilient element for biasing said drying agent body against said housing.

10. A drying agent box according to claim 1, wherein the drying agent body is a one-piece molded body.

11. A drying agent box according to claim 1, further comprising a socket connected to the housing, wherein the drying agent body is screwed into the socket.

12. A drying agent box for drying compressed air, comprising a housing having at least one inlet and at least one outlet, a sintered or cast drying agent body contained in said housing interposed in a flow path between said inlet and said outlet, and a holder connected to an interior surface of the housing, wherein the drying agent body is snapped into the holder, and wherein the sintered or cast drying agent body has a stable shape.

13. A drying agent box according to claim 12, further comprising an oil separator interposed in the flow path between said inlet and said drying agent body.

14. A drying agent box according to claim 12, wherein the drying agent body has channels for guiding the flow.

15. A drying agent box according to claim 12, wherein there is a gap between the drying agent body and the housing.

16. A drying agent box according to claim 12, further comprising a seal between the drying agent body and the housing.

17. A drying agent box according to claim 12, wherein the drying agent body is surrounded by a jacket.

18. A drying agent box according to claim 12, wherein the drying agent body comprises a plurality of modular subunits joined in fixed relation to each other to form said stable shape.

19. A drying agent box according to claim 18, further comprising connecting elements which sealingly joining adjacent modular subunits of the drying agent body to each other.

20. A drying agent box according to claim 12, further comprising a resilient element for biasing said drying agent body against said housing.

21. A drying agent box according to claim 12, wherein the drying agent body is a one-piece molded body.

22. A drying agent box according to claim 12, further comprising a socket connected to the housing, wherein the drying agent body is snapped into the socket.

* * * * *